United States Patent
Inaba et al.

(10) Patent No.: US 7,317,059 B2
(45) Date of Patent: Jan. 8, 2008

(54) LIGAND IMMOBILIZATION SUPPORT

(75) Inventors: Yoshihiro Inaba, Kanagawa (JP);
Hiroshi Yamamoto, Kanagawa (JP);
Takako Kobayashi, Kanagawa (JP);
Chisato Urano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 355 days.

(21) Appl. No.: 11/057,159

(22) Filed: Feb. 15, 2005

(65) Prior Publication Data

US 2006/0069213 A1 Mar. 30, 2006

(30) Foreign Application Priority Data

Sep. 24, 2004 (JP) ............................ 2004-278199

(51) Int. Cl.
*C08F 26/06* (2006.01)
(52) U.S. Cl. .................. 526/258; 526/317.1; 526/346; 525/375
(58) Field of Classification Search ............ 526/317.1, 526/258, 346; 525/375
See application file for complete search history.

(56) References Cited

U.S. PATENT DOCUMENTS 4,079,041 A * 3/1978 Baumann et al. ........... 526/258
4,544,621 A * 10/1985 Roth ........................ 430/271.1
6,602,498 B2 * 8/2003 Shen ........................ 424/78.08

FOREIGN PATENT DOCUMENTS

| JP | 6-34633 A | 2/1994 |
| JP | 7-146280 A | 6/1995 |
| JP | 2004-45120 A | 2/2004 |

* cited by examiner

*Primary Examiner*—Ling-Sui Choi
(74) *Attorney, Agent, or Firm*—Sughrue Mion Pllc

(57) ABSTRACT

A polymer comprising a styrene-based monomer and t-butyl methacrylate, wherein a proportion of the styrene-based monomer in the polymer is 30% by mol to 90% by mol and the polymer has a functional group represented by the following formula (1) which includes a maleimidyl group:

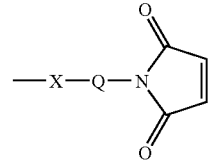

Formula (1)

wherein in the formula (1), X represents —O— or —NH— and Q represents a spacer group. A ligand immobilization support comprising the polymer.

20 Claims, No Drawings

LIGAND IMMOBILIZATION SUPPORT

CROSS-REFERENCE TO RELATED APPLICATION

This application claims priority under 35 USC 119 from Japanese patent Application No. 2004-278199, the disclosure of which is incorporated by reference herein.

BACKGROUND OF THE INVENTION

1. Field of the Invention

The present invention is related to a polymer which is suitable for use in a diagnostic product, a test drug, or a liquid chromatography, particularly to a polymer which is suitable for use as a ligand immobilization support. The ligand immobilization support utilizes the affinity chromatography principle and is suitable for separation or purification of a valuable substance or a disease agent in a liquid, such as an antibody.

2. Description of the Related Art

A purification technique called "affinity chromatography" has been reported (for example, in "Immobilized Affinity Ligand Techniques", (Academic Press, 1992), the disclosure of which is incorporated herein by reference). In the technique, a substance (ligand) having an affinity to the target substance to be purified or to be separated is immobilized on an insoluble polymer, and the target substance is specifically adsorbed by the ligand and collected. For the purification of antibodies, methods have been disclosed such as a method (see, for example, Japanese Patent application Laid-Open (JP-A) No. 7-146280, the disclosure of which is incorporated by reference herein) using an affinity gel in which κ light-chain binding protein is bonded to an agarose gel, or a method (see, for example, JP-A No. 6-34633, the disclosure of which is incorporated by reference herein) using a support obtained by immobilizing a ligand (antibody) on a water-insoluble cellulose through an epoxydation reaction with a hydrophilic spacer having epoxy groups at both terminals thereof.

If a support gel derived from a natural product such as agarose is used, however, the gel itself dissolves at 40° C. or higher and is not stable when the temperature is changed. Moreover, a highly toxic agent such as epichlorohydrin has to be used in order to synthesize epoxydated cellulose from cellulose. The synthesized epoxydated cellulose binds to functional groups on the ligand with a low selectivity. Therefore, the epoxydated cellulose binds also to the moiety on the ligand having the affinity to the target substance. As a result, the affinity of the ligand on the support is not strong. Further, the purity of the support gel such as agarose or cellulose is low since such materials are derived from natural products.

A ligand immobilization support has been disclosed in which a ligand and a support are bonded to each other by a disulfide bond. The following can be referenced: JP-A No. 2004-45120 (the disclosure of which is incorporated herein by reference) and "Immobilized Affinity Ligand Techniques", (Academic Press, 1992). However, the disulfide bond is chemically unstable and easily cleaved in the presence of other compounds (such as peptides and proteins having cysteine moieties) having thiol groups.

Immobilization supports have been disclosed (for example in JP-A Nos. 6-34633 and 2004-45120) which are synthesized polymers such as: a polystryrene or polymethacrylic acid having functional groups (such as a thiol group, an amino group, a hydroxyl group, and a carboxyl group), a derivative thereof, and a copolymer thereof; polyvinyl alcohol; and styrene-divinylbenzene copolymer. However, the above general synthesized polymers have problems. For example, if the immobilization support is an aliphatic polymer such as polymethylmethacrylate or polymethacrylic acid, the performance on antibody separation is very low. If the immobilization support is an aromatic polymer such as polystyrene or hydroxymethylpolystyrene, the selectivity is low and antibodies other than the target antibody are also adsorbed nonspecifically.

SUMMARY OF THE INVENTION

The present invention has been made in consideration of the above problems of prior art.

The invention provides a polymer comprising a styrene-based monomer and t-butyl methacrylate. The proportion of the styrene-based polymer in the polymer is 30% by mol to 90% by mol. The monomers in the polymer include a monomer having a functional group represented by the following formula (1). As shown in the formula (1), the functional group includes a maleimidyl group. The styrene-based monomer and t-butyl methacrylate may have such functional groups.

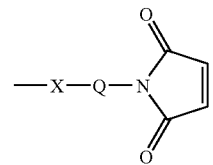

Formula (1)

In the formula (1), X represents —O— or —NH—, and Q represents a spacer group.

In a preferable embodiment, the spacer group represented by Q in the formula (1) includes a polyoxyethylene chain and the polymer is insoluble in water. In another preferable embodiment, the polymer is a cross-linked polymer and is in the shape of a particle.

The polymer is suitable for use as a ligand immobilization support.

DESCRIPTION OF THE INVENTION

The polymer of the invention is a polymer comprising a styrene-based polymer and t-butyl methacrylate, wherein the proportion of the styrene-based monomer is 30% by mol to 90% by mol, and the polymer includes a functional group including a maleimidyl group represented by the formula (1).

In the following, the present invention will be described specifically.

The polymer of the invention is a polymer comprising a styrene-based polymer and t-butyl methacrylate, wherein the proportion of the styrene-based monomer is 30% by mol to 90% by mol, and the polymer includes a functional group represented by the formula (1). The proportion of the styrene-based monomer is preferably 40% by mol to 80% by mol.

Monomers other than the styrene-based monomer and t-butyl methacrylate may be included in the polymer as long as the above condition is satisfied. Examples of the other monomers include (meth)acrylic acid, hydroxyethyl(meth)acrylate, divinylbenzene, and ethyleneglycol dimethacrylate. Divinylbenzene and ethyleneglycol dimethacrylate are preferable when the polymer is a cross-linked polymer.

If the proportion of the styrene-based monomer is higher than 90% by mol, the substance selectivity of the ligand is reduced and adsorption of substances other than the target substance is substantial. If the proportion of the styrene-based monomer is lower than 30% by mol, the affinity of the ligand for the target substance is reduced and the adsorption of the target substance is largely reduced.

The functional group represented by the formula (1) may be introduced into the carboxyl group in t-butyl methacrylate. The proportion of the carboxyl groups substituted by the functional groups in all the carboxyl groups is preferably 1 to 100%, more preferably 10 to 90%.

The functional group represented by the formula (1) will be explained.

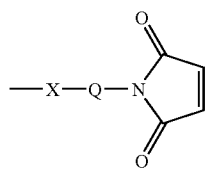

Formula (1)

In the formula (1), X represents —O— or —NH—. Q represents a spacer group. The spacer group is preferably a divalent linking group including a polyoxyethylene chain, an alkylene chain, an amino chain, or a polyoxypropylene group. The specer group is more preferably a divalent linking group represented by any of the following formulae.

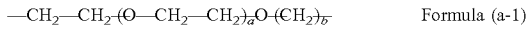 Formula (a-1)

 Formula(a-2)

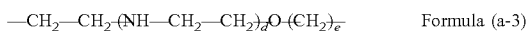 Formula (a-3)

When the spacer group is a group represented by the formula (a-1), "a" represents a positive integer. The length of the polyoxyethylene chain is not particularly limited. However, the molecular weight of the spacer is preferably 60 to 10000, more preferably 100 to 1000. The polyoxyethylene chain represented by (a-1) may be ethylene oxide. In the formula (a-1), b represents 0 or a positive integer, preferably, an integer of 0 to 6, more preferably, 0, 1, or 2, particularly preferably, 0 or 1.

When the spacer group is a group represented by the formula (a-1), the functional group represented by (1) can be obtained by combining a terminal hydroxyl group of the polyoxyethylene with the hydroxyl group of a hydroxyl-group-containing maleimide through an etherification reaction. If there is an alkylene group between the maleimidyl group and the hydroxyl group (when b is 1 or larger), the hydroxyl-group-containing maleimide may be a hydroxyalkylmaleimide.

If the spacer is represented by the formula (a-1) and X represents —O—, the functional group represented by the formula (1) may be synthesized by combining a terminal hydroxyl group of the polyoxyethylene with the hydroxyl group of a hydroxyl-group-containing maleimide through an etherification reaction. The oxygen atom of X is the oxygen atom in the other terminal hydroxyl group of the polyoxyethylene.

If the spacer is represented by the formula (a-1) and X represents —NH—, the functional group represented by the formula (1) may be synthesized, for example, by: combining a terminal hydroxyl group of a polyoxyethylene with the hydroxyl group of a hydroxyl-group-containing maleimide through an etherification reaction, then converting the other terminal hydroxyl group of the polyoxyethylene to an amino group; or allowing maleic anhydride to react with a compound including a moiety represented by the formula (a-1) and amino groups at both terminals of the moiety, then dehydrating the product to cause a ring-closing reaction; or converting one of the terminal hydroxyl groups of a polyoxyethylene to an amino group, then causing an etherification reaction between the other terminal hydroxyl group of the polyoxyethylene and the hydroxyl group of a hydroxyl-group-containing maleimide; or converting a terminal hydroxyl group of a polyoxyethylene to an amino group, then allowing the modified polyoxyethylene to react with a bifunctional agent having an N-hydroxysuccinimide ester group and a maleimidyl group.

In the formula (a-2), c represents a positive integer, preferably, an integer of 1 to 12, more preferably, an integer of 1 to 6.

If the spacer group is represented by the formula (a-2) and X represents —O—, the functional group represented by the formula (1) can be obtained, for example, from a compound including a maleimidyl group, a hydroxyl group, and an alkylene group linking the maleimidyl group and the hydroxyl group, such as hydroxymethylmaleimide.

If the spacer group is represented by the formula (a-2) and X represents —NH—, the functional group represented by the formula (1) can be obtained according to a method similar to the above-described methods in the case where the spacer group is represented by the formula (a-1) and X represents —NH—.

In the formula (a-3), d represents a positive integer, preferably, an integer of 1 to 6, and more preferably, 1, 2, or 3. In the formula (a-3), e represents 0 or a positive integer. In an embodiment, e represents an integer of 0 to 6. In another embodiment, e represents 0, 1, or 2. In another embodiment, e represents 0 or 1.

If the spacer group is represented by the formula (a-3) and X represents —O—, the functional group represented by the formula (1) can be obtained, for example by: allowing maleic anhydride to react with a compound including a moiety represented by the formula (a-3) and amino groups at both terminals of the moiety, dehydrating the product to cause ring-closure reaction, and converting the unreacted terminal amino group to a hydroxyl group; or causing an etherification reaction between an amine having a hydroxyl group at one terminal and a hydroxyl-group-containing maleimide.

If the spacer group is represented by the formula (a-3) and X represents —NH—, the functional group represented by the formula (1) can be obtained, for example by: allowing maleic anhydride to react with a compound including a moiety represented by the formula (a-3) and amino groups at both terminals of the moiety, then dehydrating the product to cause ring-closure reaction; or allowing a compound including a moiety represented by the formula (a-3) and amino groups at both terminals of the moiety to react with a bifunctional agent having an N-hydroxysuccinimide ester group and a maleimidyl group.

The spacer represented by Q is preferably a spacer group represented by the formula (a-1), which has a polyoxyethylene chain. Particularly, the spacer group in the shape of a particle is suitable for use as a ligand immobilization support. The polyoxyethylene chain improves dispersability in water or a buffer solution and improves the handling property. If Q represents a linking group represented by the formula (a-1), X is preferably —O—.

The method of introducing the functional group represented by formula (1) into the copolymer is not particularly limited, and may be selected in accordance with the purpose.

For example, when X represents —O—, the functional group can be introduced, for example by: hydrolyzing the ester moieties of the base material (such as a copolymer including t-butyl (meth)acrylate) into carboxyl groups by using an acid or an alkali, and allowing the base material to react with a compound including a structure represented by the formula (1) and a hydrogen atom bonded to X in the formula (1) to form an ester bond; subjecting the base material to a transesterification reaction by using a transesterification catalyst; or adding a monomer having a functional group represented by the formula (1) to the monomers to be polymerized, and copolymerizing the monomers. If Q includes a polyoxyethylene chain such as the polyoxyethylene chain of the formula (a-1), the functional group is preferably introduced through esterification reaction after the ester moieties in the base material are hydrolyzed into carboxyl groups.

The amount of the maleimidyl group in the polymer of the invention is not particularly limited, and preferably 0.001 mmol/g. From the viewpoint of maximize the reaction amount per mass, the amount of the maleimidyl group is more preferably 0.01 mmol/g to 1.0 mmol/g, particularly preferably 0.05 mmol/g to 0.5 mmol/g. If the amount is 0.001 mmol/g or larger, the polymer as an affinity support can immobilize an SH-group-containing substance. If the amount is 0.05 mmol/g or larger, the immobilization performance is particularly high.

The term "styrene-based monomer" used herein refers to an aromatic monomer which can copolymerize with t-butyl methacrylate. Examples thereof include styrene, methylstyrene, aminostyrene, acetoxystyrene, t-butylstyrene, chlorostyrene, bromostyrene, fluorostyrene, chloromethylstyrene, cyanomethylstyrene, methoxystyrene, and phenylstyrene. Styrene is particularly preferable because of its excellent polymerizability and low cost.

Known methods can be applied for the polymerization which forms the polymer of the invention, such as the suspension polymerization method, the emulsion polymerization method, and the seed polymerization method. The membrane emulsification method can be used for the suspension polymerization. Polymerization initiating catalysts known to people in the art can be used in accordance with the necessity. Specific examples of the polymerization initiating catalysts include: organic peroxides such as diacylperoxides, ketoneperoxides, and alkylhydroperoxides; inorganic peroxides such as hydrogen peroxide and ozone; oil-soluble azo organic compounds such as azobisisobutyronitrile (AIBN; for example V-60 manufactured by Wako Pure Chemical Industries, Ltd.), 2,2'-azobis(2-methylbutylonitrile) (for example, V-59 manufactured by Wako Pure Chemical Industries, Ltd.), and 2,2'-azobis(2,4-dimethylvaleronitrile) (for example, V-65 manufactured by Wako Pure Chemical Industries, Ltd.); and water-soluble azo organic compounds such as 2,2'-azobis(2-amidinopropane) dihydrochloride(for example, V-50 manufactured by Wako Pure Chemical Industries, Ltd.), 2,2'-azobis[2-methyl-N-(2-hydroxyethyl)propionamide] (for example, VA-086 manufactured by Wako Pure Chemical Industries, Ltd.), and 2,2'-azobis[2-(2-imidazolin-2-yl)propane]]] dihydrochloride (for example, VA-044 manufactured by Wako Pure Chemical Industries, Ltd.) When a polymerization initiating agent is used, the amount of the agent to be used is such an amount that the polymerization is initiated to a sufficient degree. Such an amount is known to people in the art. Generally, the amount of the polymerization initiating agent is preferably 0.1 to 5.0% by mass.

In an embodiment, the obtained polymer is diluted and dispersed in a solvent such as methanol, subjected to filtration, washed with water and/or a solvent, and dried by a normal method such as the spray drying, the vacuum drying, or the freeze-drying. In this way, the polymer is purified as a powder.

In another embodiment, the polymer is melted or dissolved in a solvent, then formed into a desired form, and solidified by cooling the polymer or removing the solvent.

The polymer of the invention may be cross-linked in accordance with the necessity. The cross-linking reaction may be conducted at the polymerization or after the polymerization. The method for cross-linking the polymer is not particularly limited, and may comprise: adding a cross-linking agent; irradiating with an electromagnetic radiation; irradiation with electron beams; or irradiation with particle beams. The kind of the cross-linking agent is not particularly limited, and may be divinylbenzene, ethyleneglycol dimethacrylate, a urea resin, or a melamine resin.

The polymer of the invention is suitable for use as a ligand immobilization support. The method for immobilizing the ligand on the support is preferably a reaction between the maleimidyl group in the support and a mercapto group in the ligand. If the ligand is a peptide, the mercapto group of cystein residues in the peptide chain may be utilized for the immobilization. In an embodiment, if the ligand is an antibody, the antibody is digested by pepsin, only the variable region of the antibody is purified, and the formed mercapto groups in the ligand are used for the immobilization. In another embodiment, the antibody is fragmented by reduction with a thiol compound such as aminoethanethiol, and the formed mercapto groups are used for the immobilization. The reaction between the maleimidyl group and the mercapto group is fast and the formed bond has a high degree of chemical stability. The immobilization may be conducted by mixing the support and the ligand in pure water or in a buffer and stirring the liquid.

The ligand may be a synthesized product or a natural product, and is not particularly limited as long as the ligand is capable of interacting with the target substance. Antibodies and receptors are preferable examples of the ligand. Examples of the antibodies include, but not limited to, anti-CD3 antibody, anti-CD4 antibody, anti-CD28 antibody, anti-CD34 antibody, anti-CD199 antibody, anti-CCR4 antibody, anti-low density lipoprotein (LDL) antibody, anti-oxidized LDL antibody, anti-β2 microglobulin antibody, and anti-(toxins elaborated by *Staphylococcus aureus*) antibody. Other antibodies can also be selected in accordance with the necessity.

If the ligand is a receptor, the receptor may be, for example, a cytokine receptor such as CCR3 or CCR4, an immunoglobulin receptor such as Fcγ or Fcε, a scavenger receptor such as RAGE (receptor for AGE (advanced glycation end products) or LDL receptor, T-cell receptor, or a cell recognition receptor such as major histocompatibility antigen.

The support of the invention is preferably water-insoluble. The form of the support of the invention is not particularly limited. When the support is used in a liquid processing column, the support is preferably in the form of a particle, a fiber, a hollow fiber, a fiber bundle, a yarn, a net, a knitting fabric, or a fabric. The form of a particle, a fiber, a knitting fabric, a fabric, a hollow fiber, or a porous membrane is preferable since such a form has a large surface area, the column is not clogged with cells, and the flow path resistance is low. The form of a particle is particularly preferable from the viewpoint of handling property. In an embodiment, the ligand immobilization support is formed as spots on a plate or a film. In the embodiment, the spot may comprise the ligand immobilization support in the form of a particle fixed on the plate or film, or the ligand immobilization spot may be directly formed on the plate or film.

If the support is in the form of a particle, its particle size may be selected in accordance with the application. Generally, the average particle size in the dry state is 0.1 to 1000 μm. The average particle size in the dry state is preferably 1 to 200 μm from the viewpoint of easiness in solid-liquid separation, and is particularly preferably 5 to 100 μm.

In the invention, known methods can be applied for preparing the polymer in the form of a particle. Preferable examples thereof include the suspension polymerization method, the emulsion polymerization method, the dispersion polymerization method, and the seed polymerization method. The membrane emulsification method may be used for the suspension polymerization.

An advantage of the ligand immobilization support of the invention is that the support does not have a special reactive functional group and that the particle characteristics are hardly (or not at all) deteriorated by reaction with additives or the solvent, or by special functional groups which would remain in the support in the case of conventional support. Since the support of the invention is highly stable even when heat is applied or the support is exposed to the solvent, the purity can be heightened by conducting a purification treatment for a long time such as Soxhlet extraction for reducing impurities.

The support of the invention may include additives such as known dyes, pigments, carbon blacks, and magnetic powders with the aim of coloring the support. The support may be in the form of a microcapsule or a porous particle.

EXAMPLES

In the following, the present invention is described in more detail with reference to examples. However, the examples should not be construed as limiting the invention. In the examples, the term "part" refers to part by mass.

Example 1

(Synthesis of Cross-Linked Polymer Particle)

Using divinylbenzene (having a purity of 55%) as a cross-linking agent, precursor particles are prepared which include styrene (manufactured by Wako Pure Chemical Industries, Ltd.), methylmethacrylate (manufactured by Wako Pure Chemical Industries, Ltd.), and t-butyl methacrylate (manufactured by Wako Pure Chemical Industries, Ltd.) in the copolymerization ratios shown in Table 1. The method of producing the precursor particles comprises conducting the suspension polymerization, and classifying the polymer particles to obtain particles having an average particle size of 50 μm. The obtained particles are washed with ion-exchanged water and a solvent, and dried.

TABLE 1

| Precursor Particle No. | Styrene (% by mol) | Methylmethacrylate (% by mol) | t-butyl methacrylate (% by mol) |
|---|---|---|---|
| P1 | 40 | 0 | 60 |
| P2 | 75 | 0 | 25 |
| P3 | 95 | 0 | 5 |
| P4 | 25 | 0 | 75 |
| P5 | 0 | 40 | 60 |

(Introduction of Polyoxyehtylene Chain)

10 parts of the precursor particle is dispersed in 75 parts of hydrochloric acid (manufactured by Wako Pure Chemical Industries, Ltd.). 150 parts of dioxane (manufactured by Wako Pure Chemical Industries, Ltd.) is added to the dispersion and the mixture is allowed to react at 80° C. for 6 hours. The particle after the reaction is dispersed in methanol and collected from methanol (in other words, washed with methanol), then washed with ion-exchanged water and a solvent. Then, the particle is dried. In this way, a particle including polymethylmethacrylic acid is obtained. When the amount of carboxylic acid groups is measured, it is found that 98% of t-butyl methacrylate moieties in the copolymer have been converted to methacylic acid moieties.

10 parts of the obtained particle is mixed with 150 parts of polyethyleneglycol 200 (manufactured by Wako Pure Chemical Industries, Ltd.) and 15 parts of sulfuric acid (manufactured by Wako Pure Chemical Industries, Ltd.). The mixture is allowed to react at 120° C. for 5 hours. Then, the particle is washed with ion-exchanged water and a solvent, and dried to obtain base material particle including a polyoxyethylene chain. Base material particle PP-1 to PP-5 including polyoxyethylene chains are respectively prepared from precursor particles P-1 to P-5, in the above-described manner.

(Introduction of Maleimidyl Group)

5 parts of hydroxymethylmaleimide and 350 parts of toluene are added to 10 parts of the base material particle obtained above. The mixture is heated to 60 to 70° C. and stirred. 0.5 part of p-toluenesulfonic acid monohydride as a catalyst is added to the mixture, and the mixture is allowed to react at an elevated temperature under reflux for 6 hours. The particle after the reaction is dispersed in methanol then collected from methanol (in other words, washed with methanol). Then, the particle is subjected to Soxhlet extraction with ethanol for 8 hours. Then, the particle is filtrated, washed with ion-exchanged water and a solvent, and dried to obtain a ligand immobilization support. Supports 1 to 5 (samples 1 to 5) are prepared respectively from the base material particles PP-1 to PP-5, in the above-described manner. The amount of the maleimidyl group in the support particle is measured as follows.

(Method for Measuring the Amount of the Maleimidyl Group in the Support Particle)

W g of the support particle is put in a screw-cap test tube. A predetermined amount of a solution of 2-mercaptoethylamine (manufactured by Tokyo Kasei Kogyo Co., Ltd.) is poured into the test tube such that the amount of 2-mercaptoethylamine is excessive. Then, the liquid in the test tube is stirred.

The particle is removed from the liquid by a centrifugation and the supernatant of the centrifuged liquid is allowed to react with 2-mercaptoamine and 4,4'-dithiodipyridine. The absorbance at 324 nm of the supernatant after the reaction is measured and the amount of 2-mercaptoethylamine in the supernatant is determined by using a molar absorbance coefficient ε of 19800. The amount of 2-mercaptoethylamine in the supernatant is represented by B (mol) hereinafter. As the blank test, the amount (represented by C (mol) hereinafter) of 2-mercaptoamine in a system not including the sample (not using the support particle) is also measured in the same manner. The amount (represented by M (mmol/g) hereinafter) of the maleimidyl group is calculated according to the following formula:

$$M=(C-B)/W\times1000$$

The amount of the maleimidyl group determined as described above is shown in Table 2. 1 part of the support particle is put in 10 parts of pure water and subjected to an ultrasonic treatment. Then, the liquid is observed with a microscope. As a result, it is found that the samples other than sample 3 are dispersed well.

TABLE 2

| Sample No. | Amount of Maleimidyl (mmol/g) | Styrene content (mol %) | Note |
| --- | --- | --- | --- |
| 1 | 0.2 | 40 | Invention |
| 2 | 0.2 | 75 | Invention |
| 3 | 0.01 | 95 | Comp. Ex. |
| 4 | 0.3 | 25 | Comp. Ex. |
| 5 | 0.2 | 0 | Comp. Ex. |

(Evaluation of Impurity)

The support is immersed in 0.1 mol/l phosphate-EDTA buffer having a pH of 7.2 at 30° C. for 3 hours. The support is removed by centrifugation and the absorbance at 280 nm of the supernatant is measured with a spectrophotometer (U-3310 manufactured by Hitachi, Ltd.). The absorbances in the cases of samples 1 to 4 are almost the same and are within the range of 0.005 to 0.01. When an activated thiolsepharose 4B (manufactured by Amersham Biosciences K.K.) is used as a comparative support, the absorbance of the supernatant is higher by 0.2 than in the cases of samples 1 to 4. It is proved that the comparative agarose-based ligand immobilization support derived from a natural product includes a lot of impurities.

(Evaluation of Affinity Characteristics)

The affinity characteristics of the support are evaluated as follows:

Procedure 1): a Mouse IgG (manufactured by Wako Pure Chemical Industries, Ltd., product code 132-13726) as the primary antibody is fragmented by reduction and bound to the support particle. Then, a Rabbit IgG (H+L) which is an anti-Mouse IgG antibody is used for affinity coupling as the secondary antibody. The Rabbit IgG (H+L) is manufactured by Wako Pure Chemical Industries, Ltd. with a product code of 017-17601. Then, a separation treatment is conducted which is capable of separating the secondary antibody. The existence or absence of the secondary antibody in the separation solution is determined by the SDS-PAGE.

Procedure 2): The primary antibody is mixed with the support particle without being fragmented by reduction. The secondary antibody is added and affinity coupling is conducted. Then, a separation treatment is conducted which is capable of separating the secondary antibody. The existence or absence of the secondary antibody in the separation solution is determined by the SDS-PAGE.

The following criteria is applied:

Regarding Procedure 1)

A: The existence of the secondary of the antibody in the separation solution is confirmed.

B: The existence of the secondary of the antibody in the separation solution is not confirmed.

Regarding Procedure 2)

A: The existence of the secondary of the antibody in the separation solution is not confirmed.

B: The existence of the secondary of the antibody in the separation solution is confirmed.

The results of the evaluation are shown in Table 3.

TABLE 3

| Sample No. | Styrene content (% by mol) | (1) Result of Evaluation | (2) Result of Evaluation | Note |
| --- | --- | --- | --- | --- |
| 1 | 40 | A | A | Invention |
| 2 | 75 | A | A | Invention |
| 3 | 95 | A | B | Comp. Ex. |
| 4 | 25 | B | B | Comp. Ex. |
| 5 | 0 | B | B | Comp. Ex. |

As is clear from Table 3, if the content of styrene is higher than 90% by mol, physical adsorption is enhanced and the selectivity is lowered, while if the content of styrene is lower than 30% by mol, the affinity characteristics degrade.

According to the invention, it is possible to obtain a polymer having a high thermal stability, high purity, and high affinity, and capable of forming highly chemically stable bond between the ligand and the polymer. It is also possible to obtain a ligand immobilization support including the polymer.

What is claimed is:

1. A polymer comprising a styrene-based monomer and t-butyl methacrylate, wherein the amount of the styrene-based monomer in the polymer is from 30% by mol to 90% by mol, and the polymer has a functional group represented by the following formula (1) which includes a maleimidyl group:

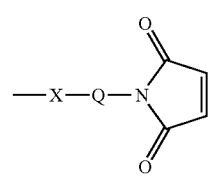

Formula (1)

wherein in the formula (1), X represents —O— or —NH— and Q represents a spacer group, and wherein the functional group represented by formula (1) is introduced into the carboxyl group of the t-butyl methacrylate.

2. A polymer comprising a styrene-based monomer and t-butyl methacrylate, wherein the amount of the styrene-based monomer in the polymer is from 30% by mol to 90% by mol, and the polymer has a functional group represented by the following formula (1) which includes a maleimidyl group:

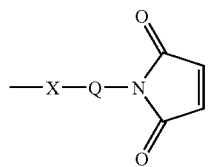

Formula (1)

wherein in the formula (1), X represents —O— or —NH— and Q represents a spacer group, and wherein the polymer is water-insoluble and the spacer group includes a polyoxyethylene chain.

3. The polymer according to claim 2, wherein the spacer group is represented by the following formula (a-1):

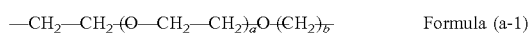

Formula (a-1)

wherein in the formula a-1), a represents a positive integer and b represents 0 or a positive integer.

4. The polymer according to claim 3, wherein a molecular weight of the spacer group is from 60 to 10,000.

5. The polymer according to claim 4, wherein the molecular weight of the spacer group is from 100 to 1,000.

6. The polymer according to claim 1, wherein the spacer group includes an alkylene chain.

7. The polymer according to claim 1, wherein the spacer group includes an amino chain.

8. A polymer comprising a styrene-based monomer and t-butyl methacrylate, wherein the amount of the styrene-based monomer in the polymer is from 30% by mol to 90% by mol, and the polymer has a functional group represented by the following formula (1) which includes a maleimidyl group:

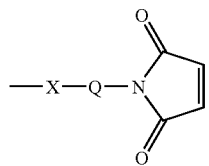

Formula (1)

wherein in the formula (1), X represents —O— or —NH— and Q represents a spacer group represented by the following formula (a-3):

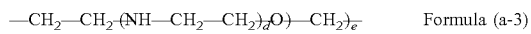

Formula (a-3)

wherein in the formula (a-3), d represents a positive integer and e represents 0 or a positive integer.

9. A polymer comprising a styrene-based monomer and t-butyl methacrylate, wherein the amount of the styrene-based monomer in the polymer is from 30% by mol to 90% by mol, and the polymer has a functional group represented by the following formula (1) which includes a maleimidyl group:

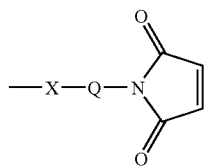

Formula (1)

wherein in the formula (1), X represents —O— or —NH— and Q represents a spacer group, and wherein the spacer group includes a polyoxypropylene group.

10. The polymer according to claim 1, wherein the amount of the styrene-based monomer is from 40% by mol to 80% by mol.

11. The polymer according to claim 1, wherein a content of the maleimidyl group is 0.001 mmol/g or higher.

12. A polymer comprising a styrene-based monomer and t-butyl methacrylate, wherein the amount of the styrene-based monomer in the polymer is from 30% by mol to 90% by mol, and the polymer has a functional group represented by the following formula (1) which includes a maleimidyl group:

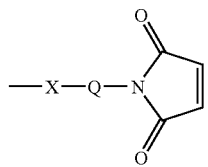

Formula (1)

wherein in the formula (1), X represents —O— or —NH— and Q represents a spacer group, and wherein the content of the maleimidyl group is from 0.01 to 1.0 mmol/g.

13. The polymer according to claim 12, wherein the content of the maleimidyl group is from 0.05 to 0.5 mmol/g.

14. The polymer according to claim 1, wherein the polymer is cross-linked and in particulate form.

15. A ligand immobilization support, wherein the ligand immobilization support includes the polymer according to claim 1.

16. The ligand immobilization support according to claim 15, wherein the polymer is water-insoluble and the spacer group includes a polyoxyethylene chain.

17. The ligand immobilization support according to claim 16, wherein the spacer group is represented by the following formula a-1):

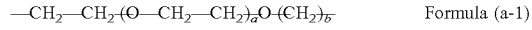

Formula (a-1)

wherein in the formula a-1), a represents a positive integer and b represents 0 or a positive integer.

18. The ligand immobilization support according to claim 15, wherein a content of the maleimidyl group is from 0.01 to 1.0 mmol/g.

19. The ligand immobilization support according to claim 15, wherein the polymer is cross-linked and in particulate form.

20. The ligand immobilization support according to claim 15, wherein the proportion of the styrene-based monomer is from 40% by mol to 80% by mol.

* * * * *